United States Patent Office 3,152,867
Patented Oct. 13, 1964

3,152,867
PREPARATION OF DECABORANE
George Noblit Tyson, Jr., Claremont, Calif., assignor to Olin Mathieson Chemical Corporation, a corporation of Virginia
No Drawing. Filed Apr. 2, 1957, Ser. No. 650,282
3 Claims. (Cl. 23—204)

This invention relates to the preparation of decaborane and provides a method for production of decaborane from the reaction of pentaborane (9) and amines.

Decaborane is a stable, white, crystalline material with a melting point of 99.5° C. Its boiling point is 213° C. at atmospheric pressure and its density is 0.94 gram per cc. at 25° C. The vapor pressure of this compound is 19.0 mm. of mercury at 100° C. Decaborane is a boron hydride of very high boron content and has a very high heat of combustion indicating its utility as a high energy fuel. It is an extremely valuable material for the preparation of liquid fuels. Methods for the preparation and ultilization of such liquid fuels are described in Altwicker, Garrett, Harris and Weilmuenster application Serial No. 497,407, filed March 28, 1955, now U.S. Patent No. 2,999,117.

Processes for the production of decaborane from diborane have been proposed. In the majority of these processes it has been proposed to produce decaborane by the thermal treatment or pyrolysis of diborane. The conversion of diborane to decaborane at moderately elevated temperatures, at which temperatures most of the volatile boranes will undergo polymerization to form boranes of higher molecular weight than diborane, appears to be quite complex and the reaction mechanisms still are not completely understood. In carrying out the process for the production of decaborane involving the pyrolysis of diborane, a complete range of boron hydrides including the high molecular weight solid products is produced. A major disadvantage of this process is that the production of the high molecular weight solid boron hydrides, which invariably accompany the formation of decaborane in such a process, respresents a loss of valuable boron from the process and a consequent reduction in yield of desired decaborane. These solid products are extremely inert and at the present state of the art there is no really good method for converting them into useful materials. Another important disadvantage of the pyrolysis process for the production of decaborane from diborane is that a number of the boron hydrides are produced and the conversion to the desired decaborane is extremely small.

There is a need therefore for a process for producing decaborane which reduces the formation of these undesirable solid products and which gives a high conversion of the starting boron hydride to the desired decaborane.

By the process of this invention pentaborane (9), which can be prepared by methods which are described in the art, can be converted to decaborane by reaction with amines such as aniline or diphenylamine at moderate temperatures to give high yields of decaborane. With this process, the production of undesirable solid hydrides of high molecular weight is almost completely avoided.

The following examples illustrate various embodiments falling within the scope of this invention and are to be considered as not limiting. In the examples the term "moles" signifies gram moles.

Example I

This reaction was conducted in a pyrex tube approximately 8 inches long by 1 inch in diameter which could be connected to a conventional high vacuum system through a ground glass joint. 2.735 millimoles of diphenylamine were weighed out into the reaction tube. After the amine had been weighed into the tube, the reactor was connected to the high vacuum system. The amine was cooled to —196° C. by placing a liquid nitrogen bath around the tube, and the reaction tube was evacuated. Then 2.10 millimoles of pentaborane (9) were condensed on top of the diphenylamine in the reaction tube. The reaction vessel was sealed off from the high vacuum system by means of a stop cock and was allowed to warm to room temperature. As the diphenylamine and pentaborane (9) melted together, a liquid formed.

The reaction tube which was still sealed off from the vacuum system was treated as follows: the bottom quarter of the tube was placed into a hot oil bath and held at a temperature of 80–100° C. for two hours. The liquid in the tube which was originally clear at room temperature changed to a yellow color. On cooling the reaction tube to room temperature, the liquid solidified over a period of 1 hour to a solid mass of yellow crystalline material. The reaction tube then was immersed in a liquid nitrogen bath and cooled to —196° C. The stopcock to the high vacuum system was opened and the reaction tube was evacuated while being maintained at —196° C. 1.86 millimoles of hydrogen were obtained. Then the reaction tube was allowed to warm to room temperature and the unreacted pentaborane (9) was collected in a trap cooled to —78° C. The pentaborane (9) measured 1.61 millimoles. White crystals of decaborane remained behind in the collection trap upon vaporizing the pentaborane (9). These crystals could be sublimed readily with farm air. The crystals were subsequently dissolved in a 5 percent quinoline solution of xylene. A blood red solution formed containing a quinoline-decaborane adduct. This analysis was done according to the directions of Hill and Johnson, Anal. Chem. 27, 1300–1305 (1955). On warming the red solution the color persisted for at least 48 hours. The red crystals of the quinoline-decaborane adduct decomposed at 240–250° C.

Example II

This reaction was conducted in the same apparatus as Example I. 5.47 millimoles of aniline were measured into the reaction tube. The reaction tube was then attached to the high vacuum line and the aniline was cooled to —196° C. by placing a liquid nitrogen bath around the tube. The reactor tube was evacuated while the aniline was maintained at —196° C. After evacuation, 4.64 millimoles of pentaborane (9) were condensed on top of the aniline. The reaction tube then was closed off from the high vacuum system and the aniline and pentaborane (9) allowed to warm very slowly to room temperature. The material in the sample tube became liquid. Upon standing at room temperature for one-half hour, the liquid became a white solid. The white solid was cooled to —196° C. and 1.02 millimoles of hydrogen were recovered from the reactor. After the hydrogen was removed, the reaction tube was allowed to warm to room temperature and all volatiles were collected in a trap cooled to —196° C. leaving a white solid in the reaction tube as a residue. From this trap, 3.08 millimoles of unreacted pentaborane (9) were recovered which had a vapor pressure of 61 mm. of mercury at 0° C. The unreacted pentaborane (9) was returned to the reaction tube.

The reaction tube containing the white solid and the returned pentaborane (9) was sealed off by means of a stockcock from the high vacuum system and allowed to warm to room temperature and remain at that temperature for 13 hours. Then the reaction tube was cooled with liquid nitrogen to —196° C. and 2.73 millimoles of hydrogen were recovered in addition to 2.49 millimoles of unreacted pentaborane (9). The solid which remained in the reaction tube was sealed off from the high vacuum system. The reaction tube was heated for 2 days and the solids turned yellow while white crystals of decaborane formed at the top of the tube. When the heating was done, only the bottom quarter of the reaction tube was maintained in the oil bath at 100–120° C., while the top of the tube was essentially at an appreciably lower temperature. The reaction tube was then cooled with liquid nitrogen and 4.48 millimoles of hydrogen were removed upon evacuation. Upon warming to room temperature a slight amount of diborane, as measured by a molecular weight determination, and some unreacted pentaborane (9) were recovered from the reaction tube. The white crystals which sublimed at the top of the reaction tube were transferred and tested for decaborane using the quinoline in xylene test. These crystals showed the characteristic ruby red color which persisted for several days and were precipitated from the solution. This analytical method of determining decaborane is described by Hill and Johnson, Analytical Chemistry, 27, 1300–1305 (1955).

Various modifications can be made in the procedures of the specific examples to provide other embodiments which fall within the scope of this invention. Thus, in place of the aniline and diphenyl amine there can be substituted other amines of the formula RR'N-phenyl wherein R is a hydrogen atom or a lower alkyl radical and wherein R' is a hydrogen atom, a lower alkyl radical or a phenyl radical. Thus, among the amines which can also be utilized are monomethyl aniline, dimethyl aniline, monoethyl aniline and diethyl aniline. Generally when the process is carried out, the molar ratio of amine to pentaborane (9) introduced into the reaction zone is within the range from 0.5:1 to 2:1 and the reaction is conducted at a temperature within the range from 75° C. to 150° C.

What is claimed is:

1. A method for the production of decaborane which comprises reacting pentaborane (9) and from 0.5 to 2 moles, based upon the moles of pentaborane (9), of an amine selected from the class consisting of aniline and diphenyl amine at a temperature within the range from 75° C to 150° C. and recovering decaborane from the reaction mixture.

2. The method of claim 1 wherein the amine is aniline.

3. The method of claim 1 wherein the amine is diphenyl amine.

References Cited in the file of this patent

Schechter et al.: "Boron Hydrides and Related Compounds," January 8, 1951, page 37. Declassified January 5, 1954, Dept. of the Navy, Bureau of Aeronautics.

Walters et al.: Report No. MSA–9973–FR, "The Preparation of Pentaborane and the Evaluation of the Hazards of Handling Diborane and Pentaborane." Written by W. H. Schechter. Pages 1–7. December 1, 1950. Declassified May 11, 1954. Mine Safety Appliance Co., Callery, Pennsylvania.